(12) United States Patent
Sugita

(10) Patent No.: US 9,821,764 B2
(45) Date of Patent: Nov. 21, 2017

(54) SMART ENTRY SYSTEM

(71) Applicant: HONDA MOTOR CO., LTD., Tokyo (JP)

(72) Inventor: Masashi Sugita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/459,156

(22) Filed: Mar. 15, 2017

(65) Prior Publication Data

US 2017/0267211 A1    Sep. 21, 2017

(30) Foreign Application Priority Data

Mar. 15, 2016    (JP) .................................. 2016-050735

(51) Int. Cl.
*B60R 25/01* (2013.01)
*E05B 81/54* (2014.01)
*B60R 25/31* (2013.01)
*B60R 21/015* (2006.01)
*B60R 25/20* (2013.01)

(52) U.S. Cl.
CPC .............. *B60R 25/01* (2013.01); *B60R 25/31* (2013.01); *E05B 81/54* (2013.01); *B60R 21/01512* (2014.10); *B60R 25/2036* (2013.01)

(58) Field of Classification Search
CPC .......... B60R 21/01512; B60R 25/2036; B60R 25/01; B60R 25/31; E05B 81/54
See application file for complete search history.

(56) References Cited

U.S. PATENT DOCUMENTS

| 4,486,806 | A | * | 12/1984 | Mochida | .............. | G07C 9/0069 |
| | | | | | | 180/286 |
| 5,835,022 | A | * | 11/1998 | Amano | ................ | B60N 2/0232 |
| | | | | | | 307/10.2 |
| 5,973,611 | A | * | 10/1999 | Kulha | ................... | B60R 25/245 |
| | | | | | | 307/10.1 |
| 6,133,646 | A | * | 10/2000 | Segawa | ................... | E05B 77/48 |
| | | | | | | 307/10.1 |
| 6,567,012 | B1 | * | 5/2003 | Matsubara | ............. | G08C 19/28 |
| | | | | | | 340/12.18 |

(Continued)

FOREIGN PATENT DOCUMENTS

JP           5311083 B        10/2013

*Primary Examiner* — Thomas Alunkal
(74) *Attorney, Agent, or Firm* — Westerman, Hattori, Daniels & Adrian, LLP

(57) ABSTRACT

A smart entry system includes a smart control unit that detects whether communication with a portable device has been established, and a centralized control unit that unlocks a driver's door when a driver's door unlock operation is detected and establishment of communication with the portable device is detected. The centralized control unit includes a timer unit that measures time when a passenger's door open operation is detected or when a passenger's door open operation is detected and the fact that communication with the portable device has not been established is detected. The centralized control unit unlocks at least one of the passengers' doors along with the driver's door when a driver's door unlock operation is detected and establishment of communication with the portable device is detected while the timer unit is measuring a certain period of time.

3 Claims, 2 Drawing Sheets

(56) References Cited

U.S. PATENT DOCUMENTS

| | | | | |
|---|---|---|---|---|
| 6,744,349 B1* | 6/2004 | Asakura | ............... | B60R 25/245 340/5.6 |
| 2002/0190842 A1* | 12/2002 | Sasaki | ............... | G07C 9/00182 340/5.31 |
| 2005/0035658 A1* | 2/2005 | Proefke | ............... | B60R 25/24 307/10.2 |
| 2015/0210289 A1* | 7/2015 | Eichin | ............... | B60W 50/0205 701/49 |
| 2016/0138305 A1* | 5/2016 | Noguchi | ............... | E05B 81/58 70/263 |

\* cited by examiner

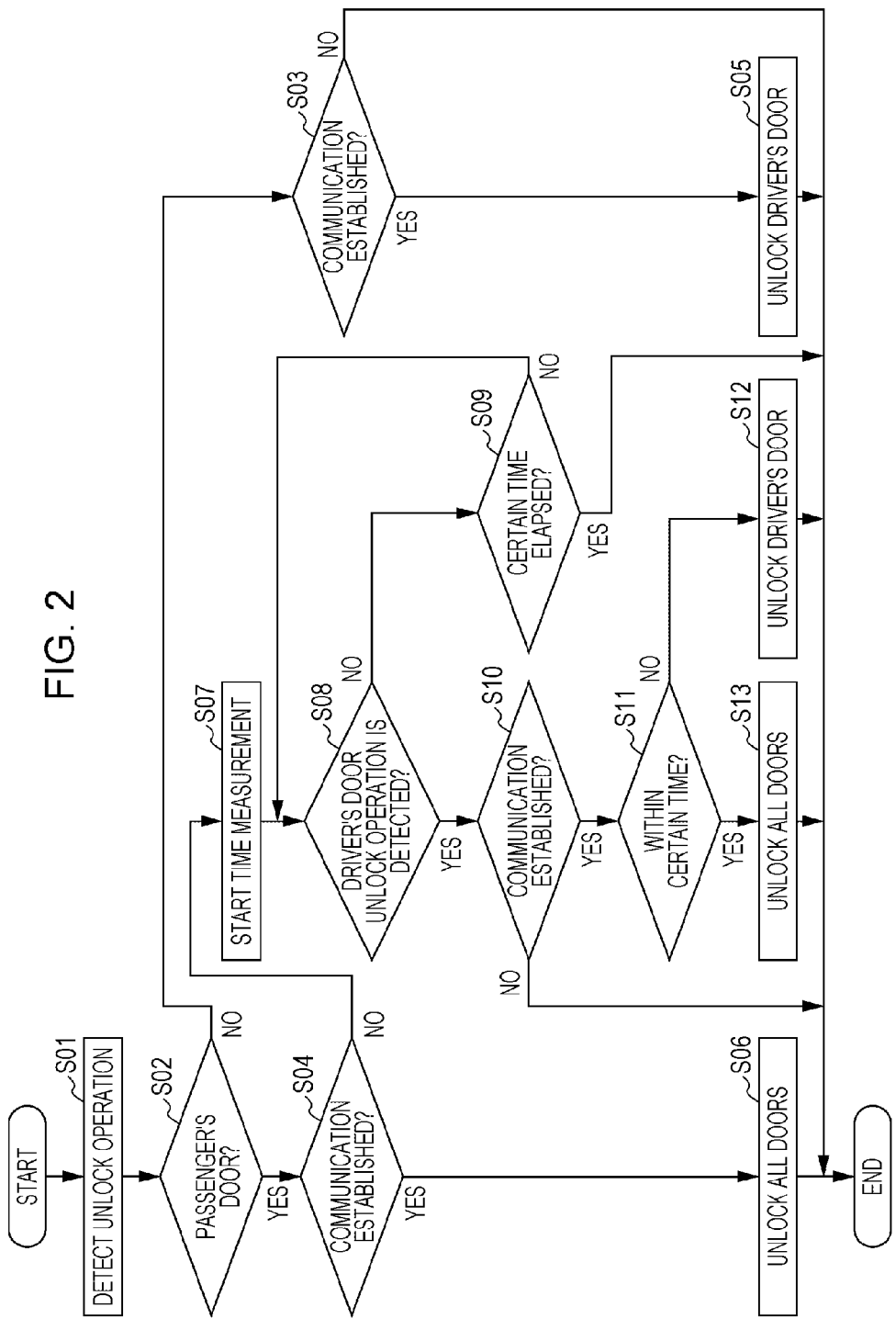

SMART ENTRY SYSTEM

CROSS REFERENCES TO RELATED APPLICATIONS

The present application claims priority under 35 U.S.C. §119 to Japanese Patent Application No. 2016-050735, filed Mar. 15, 2016, entitled "Smart Entry System." The contents of this application are incorporated herein by reference in their entirety.

BACKGROUND

1. Field

The present application relates to a smart entry system.

2. Description of the Related Art

In a smart entry system, a portable device carried by an operator (such as a driver) and an on-vehicle system mounted on a vehicle perform wireless communication to lock or unlock the doors.

For security reasons, the smart entry system may adopt a configuration where the doors other than the driver's door (hereinafter referred to as the "passengers' doors") are not unlocked in an unlocking operation. In this case, to unlock the passengers' doors, it is necessary to operate a door switch in the vehicle after unlocking the driver's door, or it is necessary for the operator, who carries the portable device, to go to the passengers' doors by himself/herself to unlock the passengers' doors. This places a heavy operation load on the operator. For the passengers (who do not carry the portable device), it is necessary to wait until the operator completes an operation of unlocking the passengers' doors, and this is also burdensome for the passengers.

Japanese Patent Publication No. 5311083 discusses technologies (so-called selectable unlocking) for selectively unlocking only the driver's door or all the doors in an unlocking operation. In Japanese Patent Publication No. 5311083, a touch sensor and a mechanical switch are provided on an exterior door handle on the driver's door.

In the configuration of Japanese Patent No. 5311083, while the driver's door is locked, when only the touch sensor is operated, only the driver's door is unlocked; and when both the touch sensor and the mechanical switch are operated within a certain period of time, all the doors are unlocked. Japanese Patent No. 5311083 also discloses a configuration where, while the driver's door is locked, when the mechanical switch is operated once, only the driver's door is unlocked; and when the mechanical switch is operated a plurality of times within a certain period of time, all the doors are unlocked.

However, the above-described smart entry system of the related art leaves room for improvement in terms of operability.

That is, in the configuration of Japanese Patent No. 5811083, unlocking all the doors by combining operations of the touch sensor and the mechanical switch involves operating a plurality of operation sections (touch sensor and mechanical switch) that have different operation methods, which is difficult for the operator to understand how to operate. Unlocking all the doors by operating the mechanical switch a plurality of times involves many operations performed by the operator until the doors are unlocked. It is difficult to alleviate the operation load on the operator.

SUMMARY

The present application describes a smart entry system capable of improving operability.

A smart entry system according to an aspect of the present application includes: a driver's door unlock detector (such as a driver's door unlock sensor 31a according to an embodiment) that is provided on a driver's door of a vehicle (such as a vehicle 1 according to the embodiment) and that detects a driver's door unlock operation; a passenger's door open operation detector (such as a front passenger's door unlock sensor 31b according to the embodiment) that detects a passenger's door open operation, the passenger's door being other than the driver's door; a communication establishment detector (such as a smart control unit 33 according to the embodiment) that detects whether communication with a portable device carried by an operator has been established; and a controller (such as a centralized control unit 39 and the smart control unit 33 according to the embodiment) that unlocks the driver's door when the driver's door unlock detector detects a driver's door unlock operation and the communication establishment detector detects that communication with the portable device has been established. The controller includes a timer unit that measures time when the passenger's door open operation detector detects a passenger's door open operation or when the passenger's door open operation detector detects a passenger's door open operation and the communication establishment detector detects that communication with the portable device has not been established. The controller unlocks at least one of passengers' doors along with the driver's door when the driver's door unlock detector detects a driver's door unlock operation and the communication establishment detector detects that communication with the portable device has been established while the timer unit is measuring a certain period of time.

Accordingly, at least one of the passengers' doors can be unlocked along with the driver's door when a driver's door unlock operation is detected and establishment of communication with the portable device is detected while the timer unit is measuring a certain period of time. In this case, the driver's door and the passengers' door(s) can be unlocked when an operator (who carries the portable device) simply performs a driver's door unlock operation within a certain period of time after, for example, a passenger (who does not carry the portable device) performs a passenger's door unlock operation. Accordingly, unlike the related art, it is not necessary for the operator to operate a door switch in the vehicle after unlocking the driver's door, or to go to the passengers' doors by himself/herself to unlock the passengers' doors. Unlike the configuration where the operator operates one or more operation sections of the same or different kinds a plurality of times, the door(s) can be selectively unlocked by the same operations (one unlock or open operation) as operations normally performed by the operator and a passenger when getting on the vehicle.

Thus, while the operation load on the operator is alleviated, the waiting time until the driver's door and the passengers' doors are unlocked can be reduced. Therefore, the smart entry system with improved operability and higher security can be provided.

The controller may unlock only the driver's door when the driver's door unlock detector detects a driver's door unlock operation and the communication establishment detector detects that communication with the portable device has been established after the certain period of time has elapsed.

Accordingly, even when a driver's door unlock operation is performed after a certain period of time has elapsed, the passengers' doors are not unlocked along with the driver's door. Accordingly, security can be reliably enhanced.

The controller may unlock the driver's door and all the passengers' doors when the passenger's door open operation detector detects a passenger's door open operation and the communication establishment detector detects that communication with the portable device has been established.

Accordingly, since all the doors are unlocked when a passenger's door open operation is detected and communication with the portable device is established, the usability in seats other than the driver's seat such as when loading and unloading luggage can be enhanced.

BRIEF DESCRIPTION OF THE DRAWINGS

FIG. 2 is a flowchart for describing an unlocking method performed by the smart entry system.

DESCRIPTION OF THE PREFERRED EMBODIMENTS

Figure 1:
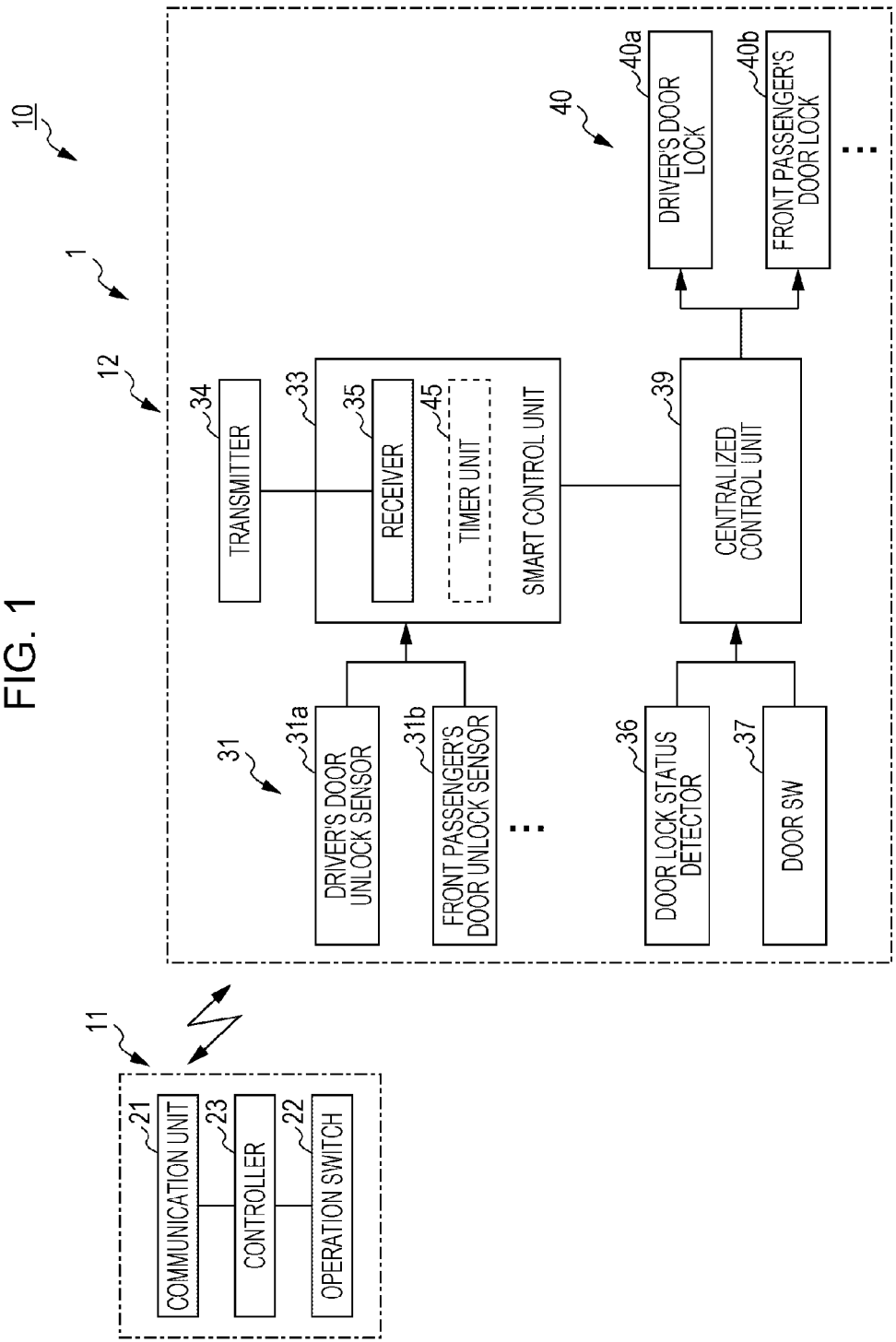
FIG. 1 is a block diagram of a smart entry system according to an embodiment.

An embodiment of the present application will be described on the basis of the drawings.

Smart Entry System

FIG. 1 is a block diagram of a smart entry system 10.

The smart entry system 10 illustrated in FIG. 1 includes a portable device 11 functioning as an electronic key of a vehicle 1, and an on-vehicle system 12 mounted on the vehicle 1.

Portable Device

The portable device 11 is a communication terminal carried by an operator (such as a driver of the vehicle 1). The portable device 11 performs wireless communication with the on-vehicle system 12. The portable device 11 transmits a response signal in response to a request signal transmitted from the on-vehicle system 12 and a command signal that instructs certain on-vehicle equipment to operate, along with unique identification information. The portable device 11 instructs, for example, a drive source (internal combustion engine, motors, and the like) of the vehicle 1 to start or stop operation, or to lock or unlock the doors of the vehicle 1.

The portable device 11 includes a communication unit 21, an operation switch 22, and a controller 23.

The communication unit 21 performs wireless communication with the on-vehicle system 12. The communication unit 21 receives, with the use of a low-frequency (LF) antenna (not illustrated), an LF signal periodically transmitted from a transmitter 34 of the on-vehicle system 12. The portable device 11 transmits, with the use of a radio-frequency (RF) antenna (not illustrated), an RF signal to a receiver 35 of the on-vehicle system 12.

The operation switch 22 receives an input operation performed by an operator and outputs a signal in accordance with the input operation (such as a command signal that instructs certain on-vehicle equipment to operate).

The controller 23 controls the overall operation of the portable device 11.

The controller 23 determines whether a request signal which is an LF signal received by the communication unit 21 is a legitimate request signal. When the controller 23 determines that the received request signal is a legitimate request signal, the controller 23 instructs the communication unit 21 to transmit a response signal which is an RF signal with unique identification information as a response to the request signal to the on-vehicle system 12. When a command signal that instructs certain on-vehicle equipment to operate is output from the operation switch 22, the controller 23 instructs the communication unit 21 to transmit the command signal to the on-vehicle system 12.

On-Vehicle System

The on-vehicle system 12 mainly includes a plurality of unlock sensors 31 (a driver's door unlock sensor 31a, a front passenger's door unlock sensor 31b, rear passengers' door unlock sensors (not illustrated), and so forth), a smart control unit 33, the transmitter 34, the receiver 35, a door lock status detector 36, a door switch 37, a centralized control unit 39, and a plurality of door locks 40 (a driver's door lock 40a, a front passenger's door lock 40b, rear passengers' door locks (not illustrated), and so forth).

The unlock sensors 31 are provided on, for example, the exterior door handles on the individual doors of the vehicle 1. That is, the driver's door unlock sensor (driver's door unlock detector) 31a is provided on the exterior door handle on the driver's door. The front passenger's door unlock sensor (passenger's door open operation detector) 31b is provided on the exterior door handle on the front passenger's door. The rear passengers' door unlock sensors (passenger's door open operation detector) are provided on the exterior door handles on the rear passengers' doors. As each unlock sensor 31, for example, a mechanical switch that detects a pressing operation or a touch sensor that detects a change in capacitance relative to the door can be adopted. Each unlock sensor 31 outputs a door unlock operation signal or a door lock operation signal in accordance with an operation performed by an operator. Note that each unlock sensor 31 may be arranged in a portion other than the exterior door handle on the door (such as a portion around the exterior door handle).

The smart control unit (communication establishment detector, controller) 33 is connected to the centralized control unit 39 and the like using, for example, a Controller Area Network (CAN) communication line so as to perform intercommunication with the centralized control unit 39 and the like. The smart control unit 33 controls wireless communication between the transmitter 34/receiver 35 and the portable device 11.

The smart control unit 33 periodically transmits a request signal which is an LF signal from the transmitter 34 to an area within a certain surrounding communication range. When the receiver 35 receives a response signal which is an RF signal from the portable device 11 in response to the request signal, the smart control unit 33 compares identification information included in the response signal with pre-stored identification information. When the received identification information matches the stored identification information, the smart control unit 33 detects that communication between the portable device 11 and the transmitter 34/receiver 35 has been established, and authenticates that an operator who carries the portable device 11 is a legitimate operator. The smart control unit 33 outputs the result of authenticating the portable device 11 (information regarding whether communication between the portable device 11 and the transmitter 34/receiver 35 has been established) as an authentication signal to the centralized control unit 39. After authenticating that the operator of the portable device 11 is a legitimate operator, when the receiver 35 receives a command signal output from the portable device 11 that instructs certain on-vehicle equipment to operate, the smart control unit 33 transmits the command signal to the centralized control unit 39.

On receipt of a signal (such as a door unlock operation signal) output from each unlock sensor 31, the smart control unit 33 transmits the signal to the centralized control unit 39.

The smart control unit 33 includes a timer unit 45, which measures time when a passenger's door unlock sensor 31 detects a passenger's door unlock operation and it is determined that communication with the portable device 11 has not been established. That is, the timer unit 45 measures time when a person other than the operator (who carries the portable device 11), such as a passenger, performs a passenger's door unlock operation. After the timer unit 45 starts measuring time, in response to detection of a driver's door unlock operation performed by the operator (when the driver's door unlock sensor 31a detects a driver's door unlock operation and it is determined that communication with the portable device 11 has been established), the smart control unit 33 transmits the result of time measurement performed by the timer unit 45 to the centralized control unit 39.

The transmitter 34 includes an LF antenna provided on each exterior door handle.

The receiver 35 includes an RF antenna included in the smart control unit 33.

The door lock status detector 36 outputs, to the centralized control unit 39, a signal of position information (door unlock and lock information) of an operation member (not illustrated) that mechanically drives the door lock 40 in accordance with an operation performed by an operator on each door.

The door switch 37 outputs a signal of each door's opening/closing information to the centralized control unit 39.

The door locks 40 are provided on the individual doors. Each door lock 40 includes a door lock mechanism (not illustrated) that unlocks and locks the door, and a door lock motor (not illustrated) that drives the door lock mechanism.

The centralized control unit (controller) 39 includes a central processing unit (CPU), a read-only memory (ROM), a random-access memory (RAM), and the like. The centralized control unit 39 controls the overall operation of various pieces of on-vehicle equipment.

The centralized control unit 39 selectively unlocks the door lock(s) 40 on the basis of the unlock operation signal, authentication signal, and measurement result output from the smart control unit 33. First of all, when the smart control unit 33 detects a passenger's door unlock operation by a passenger's (other than the driver's) unlock sensor 31 and determines that communication with the portable device 11 has been established, the centralized control unit 39 unlocks all the door locks 40.

Here, when the smart control unit 33 detects a driver's door unlock operation by the driver's door unlock sensor 31a and determines that communication with the portable device 11 has been established, the centralized control unit 39 selectively unlocks the door lock(s) 40 on the basis of the result of time measurement performed by the timer unit 45. Specifically, when the result of time measurement performed by the timer unit 45 is within a certain period of time (when a driver's door unlock operation is performed while measuring a certain period of time), the centralized control unit 39 unlocks all the door locks 40 including the driver's door lock 40a. There is an exemplary case where, after a passenger performs a passenger's door unlock operation, communication with the portable device 11 is ended by this unlock operation; and, within a certain period of time after the end of the communication, the operator performs a driver's door unlock operation. In this case, all the door locks 40 are unlocked.

In contrast, the centralized control unit 39 unlocks only the driver's door lock 40a when the result of time measurement performed by the timer unit 45 exceeds the certain period of time (or when the timer unit 45 has not started measuring time). There is an exemplary case where only the operator performs a driver's door unlock operation, or the operator performs a driver's door unlock operation after a certain period of time has elapsed since communication with the portable device 11 was ended by a passenger's door unlock operation. In this case, only the driver's door lock 40a is unlocked. Note that the above-mentioned "certain period of time" is preferably set to about two seconds. However, the "certain period of time" can be freely set by the operator.

Operation Method of Smart Entry System

Next, a door unlocking method will be described as an operation method of the smart entry system 10. FIG. 2 is a flowchart for describing an unlocking method performed by the above-described smart entry system 10.

As illustrated in FIG. 2, in step S01, the smart control unit 33 detects a door unlock operation signal.

In step S02, the smart control unit 33 determines whether the door unlock operation is a passenger's door unlock operation.

When the determination result obtained in step S02 is "NO" (when the operation is not a passenger's door unlock operation), it is determined that the operation is a driver's door unlock operation, and the routine proceeds to step S03.

In step S03, the smart control unit 33 determines whether communication between the portable device 11 and the on-vehicle system 12 has been established.

When the determination result obtained in step S03 is "NO" (when communication has not been established), the routine ends.

When the determination result obtained in step S03 is "YES" (when communication has been established), it is determined that only the operator has performed a driver's door unlock operation, and the routine proceeds to step S05.

In step S05, the centralized control unit 39 unlocks the driver's door lock 40a on the basis of an unlock operation signal and an authentication signal output from the smart control unit 33. Then, the routine ends.

When the determination result obtained in step S02 is "YES" (when the operation is a passenger's door unlock operation), the routine proceeds to step S04.

In step S04, the smart control unit 33 determines whether communication between the portable device 11 and the on-vehicle system 12 has been established.

When the determination result obtained in step S04 is "YES" (when communication has been established), it is determined that only the operator has performed a passenger's door unlock operation by himself/herself, and the routine proceeds to step S06.

In step S06, the centralized control unit 39 unlocks all the door locks 40, and the routine ends.

In contrast, when the determination result obtained in step S04 is "NO" (when communication has not been established), it is determined that a person other than the operator (such as a passenger) has performed a passenger's door unlock operation, and the routine proceeds to step S07.

In step S07, the smart control unit 33 starts measuring time using the timer unit 45, and the routine proceeds to step S08.

Next in step S08, the smart control unit 33 determines whether a driver's door unlock operation has been performed.

When the determination result obtained in step S08 is "NO", the routine proceeds to step S09.

When the determination result obtained in step S08 described above is "YES", the routine proceeds to step S10.

In step S09, the smart control unit 33 determines whether the time measured by the timer unit 45 has elapsed the certain period of time.

When the determination result obtained in step S9 is "NO", the routine returns to step S08.

When the determination result obtained in step S9 is "YES", the routine ends.

In step S10, the smart control unit 33 determines whether communication between the portable device 11 and the on-vehicle system 12 has been established. When the determination result obtained in step S10 is "YES", the routine proceeds to step S11.

When the determination result obtained in step S10 is "NO", it is determined that, for example, a person other than the operator has performed the driver's door unlock operation. In this case, the unlock operation of the door locks 40 is not performed, and the routine ends.

In step S11, the smart control unit 33 determines whether it is within the certain period of time after the start of time measurement performed by the timer unit 45.

When the determination result obtained in step S11 is "NO" (when the certain period of time has elapsed), the routine proceeds to step S12.

In step S12, the centralized control unit 39 unlocks the driver's door lock 40a on the basis of the unlock operation signal, authentication signal, and measurement result output from the smart control unit 33. Then, the routine ends. That is, only the driver's door is unlocked when, for example, the operator performs a driver's door unlock operation after the certain period of time has elapsed since communication with the portable device 11 was ended by a passenger's door unlock operation.

In contrast, when the determination result obtained in step S11 is "YES" (when it is within the certain period of time), the routine proceeds to step S13.

In step S13, the centralized control unit 39 unlocks all the door locks 40 on the basis of the unlock operation signal, authentication signal, and measurement result output from the smart control unit 33. Then, the routine ends. That is, after a passenger performs a passenger's door unlock operation, communication with the portable device 11 is ended by this unlock operation; and, within a certain period of time after the end of the communication, the operator performs a driver's door unlock operation. In that case, all the doors are unlocked.

As described above, according to the embodiment, all the doors are unlocked when a driver's door unlock operation is detected and it is detected that communication with the portable device 11 has been established within the certain period of time after the start of time measurement performed by the timer unit 45.

According to this configuration, all the doors can be unlocked when the operator simply performs a driver's door unlock operation after a passenger or the like performs a passenger's door unlock operation. Accordingly, unlike the related art, it is not necessary to operate a door switch in the vehicle after unlocking the driver's door, or it is not necessary for the operator to go to the passengers' doors by himself/herself to unlock the passengers' doors. Unlike the configuration where the operator operates one or more operation sections of the same or different kinds a plurality of times, the door(s) can be selectively unlocked by the same operations (one unlock operation) as operations normally performed by the operator and a passenger when getting on the vehicle.

Thus, while the operation load on the operator is alleviated, the waiting time until all the doors are unlocked can be reduced. Therefore, the smart entry system 10 with improved operability and higher security can be provided.

According to the embodiment, only the driver's door is unlocked when a driver's door unlock operation is detected and communication with the portable device 11 is established after the certain period of time has elapsed since the start of time measurement performed by the timer unit 45.

According to this configuration, even when a driver's door unlock operation is performed after the certain period of time has elapsed since the start of time measurement performed by the timer unit 45, the passengers' doors are not unlocked along with the driver's door. Accordingly, security can be reliably enhanced.

Since all the doors are unlocked when a passenger's door unlock operation is detected and communication with the portable device 11 is established in the embodiment, the usability in seats other than the driver's seat such as when loading and unloading luggage can be enhanced.

The technical scope of the present application is not limited to the above-described embodiment, and includes those obtained by adding various changes to the above-described embodiment without departing from the gist of the present application. That is, the configurations described in the above-described embodiment are only exemplary, and various changes can be made to the configurations.

For example, although the above-described embodiment has discussed the configuration where all the doors are unlocked when the operator performs a driver's door unlock operation after a passenger or the like performs a passenger's door unlock operation, the configuration is not limited to this case, and any configuration is acceptable as long as at least one of the passengers' doors is unlocked along with the driver's door.

The following configuration is adoptable as a time point for unlocking all the doors when the operator performs a driver's door unlock operation after a passenger or the like performs a passenger's door unlock operation. For example, the operator performs a driver's door unlock operation to unlock the door, and the driver's door is actually opened. At this time point, the passengers' doors may be unlocked. In this case, the time point at which the driver's door is opened may be within a certain period of time, or, like the above-described embodiment, a driver's door unlock operation may be within the certain period of time.

Although the operation of the door locks 40 is controlled when the centralized control unit 39 detects establishment of communication between the portable device 11 and the transmitter 34/receiver 35 after detecting a door unlock operation in the above-described embodiment, the embodiment is not limited to this case.

The centralized control unit 39 may control the operation of the door locks 40 by adopting one of the following cases: one is that the smart control unit 33 detects establishment of communication prior to detecting an operation of one of the unlock sensors 31; and another is that the smart control unit 33 detects an operation of one of the unlock sensors 31 and then newly detects establishment of communication. The smart control unit 33 may detect establishment of communication at two levels by differentiating the communication range before and after detecting an operation of one of the unlock sensors 31. For example, the smart control unit 33 may detect establishment of communication within a relatively large communication range around the vehicle 1 before detecting an operation of one of the unlock sensors 31, and may detect establishment of communication within a relatively small communication range around a corresponding one of the door handles 3 after detecting an operation of the unlock sensor 31.

Although the above-described embodiment has discussed the configuration where the timer unit 45 starts measuring time after a passenger's door unlock operation is performed and communication with the portable device 11 is ended by this passenger's door unlock operation, the embodiment is not limited to this case. For example, the configuration may be such that the timer unit 45 starts measuring time at a time point at which a passenger's door unlock operation is detected.

Although the above-described embodiment has discussed the configuration where the timer unit 45 starts measuring time when a passenger's door unlock operation is detected using the touch sensor or the mechanical switch, the embodiment is not limited to this case. For example, the configuration may be such that the timer unit 45 starts measuring time on the basis of an operation of a passenger's exterior door handle (an operation of trying to open the door).

The components in the above-described embodiment can be appropriately replaced with components of the related art without departing from the gist of the present application, and the above-described modifications may be appropriately combined.

What is claimed is:

1. A smart entry system for a vehicle having a driver's door and a passenger's door, the system comprising:
   a driver's door unlock detector provided with the driver's door of the vehicle and configured to detect a signal of a driver's door unlock operation by a driver;
   a passenger's door open operation detector configured to detect a passenger's door open operation which opens the passenger's door, the passenger's door being other than the driver's door;
   a communication establishment detector configured to detect whether communication between the vehicle and a portable device carried by a driver has been established; and
   a controller configured to unlock the driver's door when the driver's door unlock detector detects the signal of the driver's door unlock operation and the communication establishment detector detects that the communication between the vehicle and the portable device has been established, the controller being capable of unlocking each of the driver's door and the passenger's door,
   wherein the controller comprises a timer that measures a period of time elapsed from an event in which the passenger's door open operation detector detects a passenger's door open operation or a period of time elapsed from an event in which the passenger's door open operation detector detects a passenger's door open operation and the communication establishment detector detects that the communication between the vehicle and the portable device has not been established,
   wherein the controller is configured to unlock both the passengers' door and the driver's door at a time when the following conditions are met:
   (i) the driver's door unlock detector detects the driver's door unlock operation;
   (ii) the communication establishment detector detects that the communication between the vehicle and the portable device has been established; and
   (iii) the period of time being measured by the timer is within a predetermined period of time.

2. The smart entry system according to claim 1, wherein the controller unlocks only the driver's door when the driver's door unlock detector detects the driver's door unlock operation and the communication establishment detector detects that the communication between the vehicle and the portable device has been established after the period of time being measured by the timer exceeds the predetermined period of time.

3. The smart entry system according to claim 1, wherein the controller is further configured to unlock both the driver's door and the passengers' door when the passenger's door open operation detector detects the passenger's door open operation and the communication establishment detector detects that the communication between the vehicle and the portable device has been established.

* * * * *